July 7, 1970 L. L. KEOWN 3,518,918

FLUID PRESSURE DIFFERENTIAL CONTROL SYSTEM FOR ACTUATION OF A MOVABLE MEMBER

Filed April 11, 1967

LYNDON L. KEOWN
INVENTOR.

BY Ronald P. Shipman
AGENT

United States Patent Office 3,518,918
Patented July 7, 1970

3,518,918
PRESSURE DIFFERENTIAL CONTROL SYSTEM FOR ACTUATION OF A MOVABLE MEMBER

Lyndon L. Keown, San Leandro, Calif., assignor to The Singer Company—Friden Division, a corporation of New Jersey Filed Apr. 11, 1967, Ser. No. 630,017
Int. Cl. F15b *13/04, 15/17;* B23b *39/00*
U.S. Cl. 91—47 3 Claims

ABSTRACT OF THE DISCLOSURE

A multibit drilling apparatus having a horizontally movable drill positioning unit which includes a master probe for vertical movement into predrilled holes of a master template. A switch for commencing the lowering of the plurality of drill bits is controlled by the pressure of fluid in a bore provided in the master probe, which pressure is controlled by the depth of insertion of the probe into the template's predrilled holes.

BACKGROUND, FIELD OF INVENTION

This invention relates, in general, to a system for the accurate positioning and controlling of tools, such as slaved drills, according to the pattern of a master template and more particularly relates to a control system operated by fluid pressure in a template sensing probe.

BACKGROUND, PRIOR ART

In the manufacture of large quantities of articles in which a number of holes or cavities must be very accurately positioned, such as for example, printed circuit boards in which electrical circuit components, lead mounting holes are required, it is frequently the practice to utilize a number of slaved drills or punches secured to a X–Y translator frame on which is also mounted a vertically movable probe or stylus for use with a master template. The master template has very accurately positioned pre-drilled holes into which the stylus is selectively positioned and inserted. The positioning of the stylus in the individual template holes serves to make the final fine X–Y or horizontal adjustment of the drilling heads. Only after the drilling heads are accurately located in the desired horizontal position may the drill bits be lowered into drilling engagement with the article being manufactured.

In order to facilitate rapid lowering of the drill bits into engagement with the article, it has been the practice, in the past, to couple a microswitch with the stylus. As the stylus is lowered into the hole, the actuating arm of the microswitch is contacted and moved so that its internal contacts make or break an electrical circuit, which is part of the control system for lowering the drill bits.

Actuation of a microswitch as set forth above has presented several problems. It is necessary that the microswitch be actuated only when the stylus is fully seated or inserted into a template hole and not before. If the microswitch is actuated before the stylus is fully seated in the hole the drill bits will engage the article to be drilled before the bits are in their full horizontally desired position. This action takes place since the drill bits are lowered before the stylus is able to fully position the translator frame to its correct horizontal position. In addition, the depth of insertion of the stylus into the template holes is sensitive to the width of the upper edges of the hole and such edges frequently become wider through use and wear. Thus, badly worn template holes will require more penetration of the stylus into the holes before the stylus correctly and fully positions the translator frame. However, since the microswitch is usually set for actuation after lowering of the stylus by a predetermined amount there will result inaccurate drilling of holes in the article.

Further, rough handling of the master template during normal use will often cause a slight or serious amount of bending and warpage to the template which must be perfectly flat for repeatable accurate results.

SUMMARY

It is therefore an object of the present invention to provide an improved article drilling apparatus.

Another object of the present invention is to provide an improved control system for an article drilling apparatus.

Yet another object of the present invention is to provide an improved template hole sensing system.

Still another object of the present invention is to provide an improved fluid operated control system for sensing the insertion of a stylus into a hole.

In accordance with the present invention the foregoing objects are achieved by providing in a multibit drilling machine having a predrilled master template and a hole sensing stylus, a fluid pressure operated signal generating means which includes a switch for effecting the lowering of the drills into operative engagement with the articles to be drilled. Operation of the pressure operated switch is achieved by sensing the pressure of fluid in a fluid conveying channel provided in the stylus. Fluid, under pressure, flows from a pressure source, thence through the channel so long as the stylus is not fully seated or inserted into a template hole, and ceases flowing through the channel only when the probe is fully inserted into the template hole. When flow ceases the pressure switch is actuated. Thus there is obviated any necessity for measuring the downward travel of the probe as in the prior art mechanism described previously.

BRIEF DESCRIPTION OF THE FIGURES

The organization and method of operation of the invention may best be understood from the following description when read in connection with the accompanying drawings in which.

DESCRIPTION

Figures 1, 2:
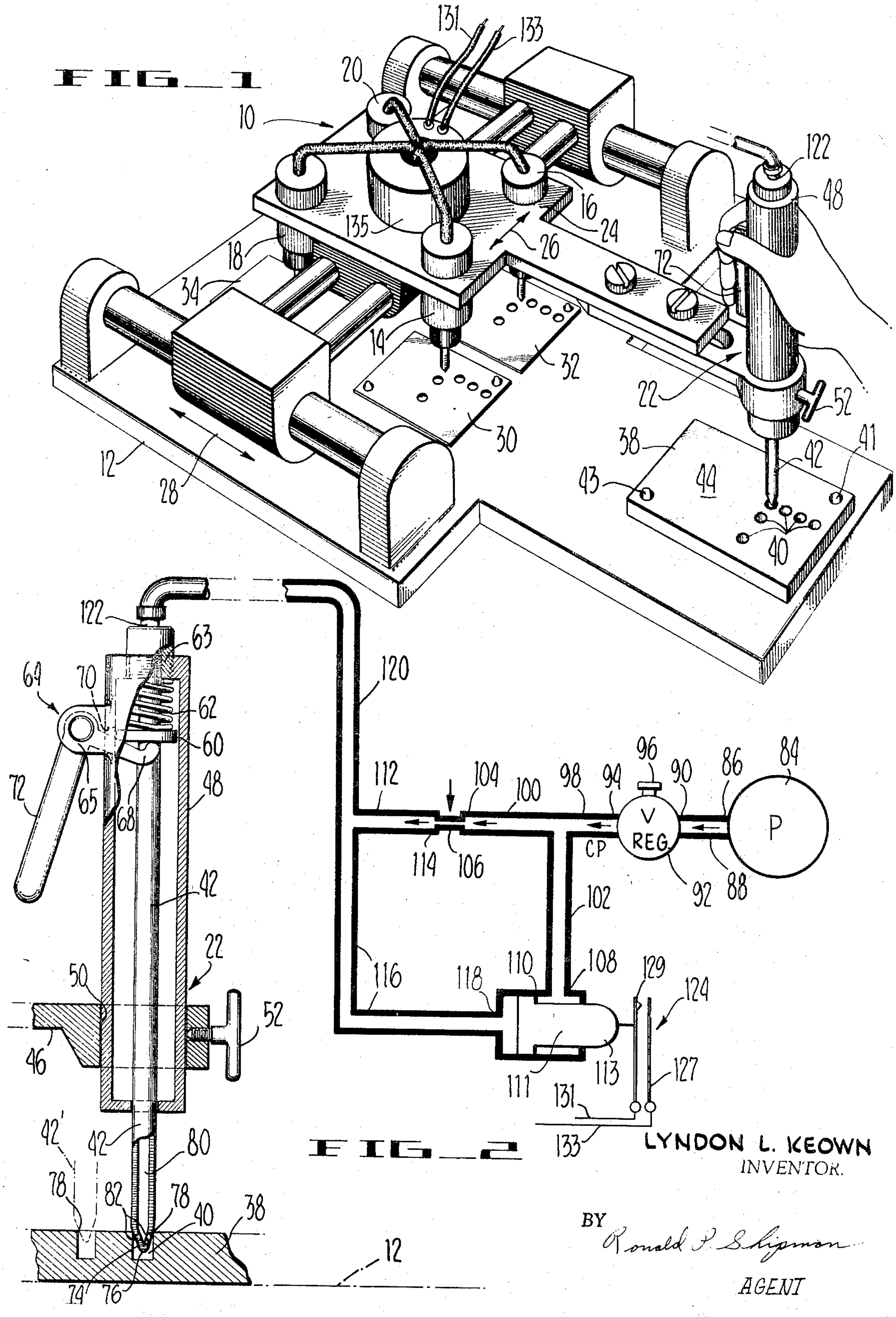
FIG. 1 is a simplified perspective view of a multihead drilling machine incorporating the present invention.
FIG. 2 is a simplified schematic diagram of a preferred embodiment of the present invention.

In FIG. 1 there is illustrated in general a multibit drilling machine 10 mounted in a stable base, or platform 12. The drilling machine includes a number of tools, or drilling heads, 14, 16, 18, and 20 and a stylus, or probe mechanism, 22 which acts as a signal generating means secured to a horizontal transistor frame 24 which is free to move in the X and Y directions, as indicated by arrows 26 and 28, respectively. The detailed construction and operation of the translator frame 24 is not set forth in detail herein, since such mechanism is well known in the art to which the present disclosure pertains.

Articles to be drilled, shown in FIG. 1 as flat plates 30, 32, and 34, are disposed on the top surface of base 12 and beneath an associated drilling head 14, 16, and 18, respectively (the article associated with drilling head 20 is not shown). Beneath the probe mechanism 22 there is disposed a master template 38 which contains a plurality of predrilled holes, or guide openings, 40 according to a predetermined pattern. The template 38 is used in cooperation with a stylus, or probe 42, which is part of the present invention, for positioning the translator frame 24 at various precise X–Y locations to effect very accurate horiontal positioning of the drill heads with respect to their respective associated articles to be manufactured.

Normally the probe 42 is biased vertically downward into firm contact with the edges of a template hole 40 or the top surface 44 of the template. The template is mounted on the base 12 so as to obviate any horizontal movement, by means well known in the art, for example, by indexing pins 41 and 43. In this manner when the probe or stylus 42 is fully inserted or seated in a template hole 40 the translator frame is maintained in a particular horizontal position, relative to the template and articles to be manufactured.

When the stylus 42 is first fully seated or inserted into a selected template hole 40 a drill control system or means, which includes the stylus 40 as a component thereof, senses that fact or condition and initiates lowering of the drill bits associated with each drill head, into drilling engagement with respective associated articles to be drilled.

When the articles are drilled through or to a predetermined depth an automatic depth control mechanism will effect withdrawal of the drill bits from the articles and return the bits to their former extreme upward position. The details of the drill lowering mechanism are not described further in this application but will be well known to those skilled in the art to which the present disclosure pertains.

Upon upward withdrawal of the stylus 42 from the template hole 40 by manual means as described in more detail below, the stylus is then manually moved horizontally to a location above a new template hole. Movement of the stylus in the horizontal direction causes likewise movement of the translator frame and accordingly locates the drill heads and bits above their associated articles at a new drilling location. The stylus 42 is then manually lowered into the new template hole 40, as described previously, to start another operation cycle.

There will now be described in detail the control system or means with particular reference to FIG. 2. The stylus mechanism 22 is mounted on an arm 46 of the translator frame 24. The probe mechanism includes a tube shaped frame or handle 48, adjustably secured in an opening 50 provided in the distal end of the arm 46, by means of a screw 52. The stylus 42 is a generally slender elongated rod mounted for reciprocal vertical movement in the probe mechanism. Bearings (not shown) may be used if desired to mount the stylus so that there is virtually no horiontal movement or mechanical play, between the stylus and the translator frame, as represented in FIG. 2 by arm 46. Other ways and means of accomplishing the vertically movable horizontally rigid mounting of the stylus may be utilized as desired.

In order to bias the stylus 42 downwardly toward the template 32, a spring retaining shoulder, or annulus, 60 is provided on the upper portion of the stylus a short distance below the top of the handle 48. The top of the handle is provided with a thredaed plug 63 through which the top of the stylus extends. A coiled compression spring 62 is disposed between the shoulder 60 and plug 63. The force of the compression spring urges or biases the stylus 42 in the downward direction.

An operating lever, or trigger mechanism, 64 is mounted on one side of the handle 48 for pivotal movement in a substantially vertical plane. One arm 68 of the operating lever extends from a pair of support members 65 (only one of which is shown in FIG. 2) through an opening 70 in the wall of the handle 48 to a location just beneath the spring retaining shoulder 60 of the stylus 42. The other arm 72 of the trigger mechanism extends generally downward from the support members 65 and alongside the exterior of the handle 48.

The downwardly biased spring retaining shoulder 60 acts on the outer end portion of horiontal lever arm 68 and releasably biases the trigger mechanism in the clockwise direction, as viewed in FIG. 2. In this manner the arm 72 is releasably biased in an outward pivoted position some distance from the exterior of the handle 48.

The handle 48 along with its trigger mechanism 64 preferably is formed, and of a size to function in the manner of a "pistol grip," i.e., a palm of a human operator may be placed in contact with the handle and one or more digits of the associated hand may be placed in contact with the lever arm 72 such that a squeezing action will cause the trigger mechanism to be pivoted in the counter-clockwise direction, as viewed in FIG. 2. Such action will effect upward motion of the stylus 42 by a predetermined amount.

Release of the gripping action by the operator will permit the force of spring 62 to effect positive movement of the stylus 42 downwardly.

The lower end portion of the stylus is formed with a generally tapered surface 74 ending in a generally rounded or blunt apex or point 76. As illustrated in FIG. 2, the diameter of the widest portion of the tapered surface 74 of the stylus is substantially larger than the diameter of the upper edge 78 of the template hole 40 into which the stylus end is inserted during operation of the present invention. In this manner the upper circular edge 78 of the template hole is enabled to make substantially full fluid tight sealing engagement with the lower end portion of the stylus even though the end of the stylus, or the circular edge of the hole, or both, are somewhat worn from use. It should be readily understood that increased wear to the end portion of the stylus or hole edge or both will have the effect of requiring increased downward travel or movement of the stylus in order to effect full fluid sealing engagement with the circular edge of the hole. However, with the present invention, as more fully explained hereinafter, an advantage is obtained wherein such change in downward travel of the stylus is readily accommodated and the sensitivity of the operation is in no way affected, in contrast with prior art systems as explained prevoiusly.

An axially extending fluid channel, or bore, 80 is provided in the stylus 42. A plurality of small bores, or ports, 82 are formed in the tapered lower end of the stylus, each of which provides fluid communication between the axial bore 80 and atmosphere at locations very close to the apex 76 of the stylus. As illustrated in FIG. 2, the small ports 82 are arranged such that they open outwardly of the tapered surface 74 at a location that is below the circular edge 78 of the template hole 40 when the stylus is inserted or seated in the hole. The template hole 40 is closed at its lower end. Thus, when the stylus 42 is seated in the hole 40, flow of fluid from the small ports 82 to atmosphere is shut off. Likewise when the stylus 42 is not seated in the hole 40, flow of fluid from the small ports 82 to atmosphere is enabled.

Flow or no-flow of fluid through the small ports 82 is utilized in the present invention in order to detect full complete seating of the stylus 42 in the hole 40, to control operation of devices, such as, for example, lowering of bits associated with the plurality of drilling heads 14, 16, 18 and 20 of FIG. 1.

A source of fluid, such as for example air, shown in FIG. 2 as pump 84 provides a substantially steady flow of fluid at a pressure in excess of atmospheric pressure at an output port 86. A conduit, or pipe, 88 is connected between the fluid source's outlet port 86 and an inlet port 90 of a pressure regulator 92 which also is provided with an outlet port 94 and a pressure regulating control 96. Manual adjustment of the regulating control will adjustably provide a flow of fluid from the outlet port 94 at a constant predetermined positive pressure.

A conduit 98 is coupled to the output port 94 of the pressure regulator 92. Coupled to and leading from the conduit 98 are two conduits, or upper and lower branch channels, 100 and 102 respectively. Flow of fluid from the conduit 98 is distributed evenly to the branch channels. The upper branch channel 100 is coupled to an input port 104 of variable fluid flow control valve, or restriction, 106, and the lower branch channel 102 is coupled to an input port 108 on the rod end of a differential cylinder and piston apparatus 110.

An output conduit 112 is coupled to an output port 114 of the variable flow control valve 106, and an input conduit 116 is coupled to an input port 118 on the head of the differential cylinder and piston apparatus 110. The two conduits 112 and 116 are merged together to form a single fluid conveying channel, or conduit, 120. In this manner the variable flow control 106 and the differential cylinder and piston apparatus 110 are coupled together in parallel fluid flow relationship between the pressure regulator 92 and conduit 120.

The single conduit 120 formed by the merger of conduits 112 and 116 is coupled to an input port 122 at the top of the stylus 42.

Fluid, such as air is supplied from the source 84 to the pressure regulator 92. By means of pressure control 96 the flow of fluid from regulator output port 94 into conduit 98 is set and maintained at a predetermined positive pressure value. The fluid in conduit 98 is divided and flows into conduit 100 and conduit 102.

Fliud from conduit 100 flows into and through flow control valve 106 and thence into conduit 112. The volume and pressure of fluid flowing into conduit 112 is regulated by adjustment of the flow control valve 106. The amount of fluid flowing into conduit 112 should be no greater than the amount of fluid that can be exhausted through the small ports 82 at the lower end of the stylus 42.

Fluid in conduit 112 will then flow into conduit 120 and thence into bore 80 of the stylus. From the bore 80 the fluid will flow freely through the small ports 82 and to atmosphere when the lower end of the stylus is not fully seated on the edge of a template hole 40.

The fluid in conduit 102 flows initially into the rod end of the differential cylinder and piston and imposes a first force $F_1$ on the piston 111 in the direction toward the head end (left end as viewed in FIG. 2). The fluid in conduit 116 will be at a pressure substantially equal to the pressure in conduit 120. Thus the fluid in conduit 116 will impose a second force $F_2$ on the piston 111 in the direction toward the rod end (right end as viewed in FIG. 2). The two forces, $F_1$ and $F_2$, act in directions opposite to each other. That force, $F_1$ or $F_2$, whichever is the greater of the two, will overcome the other and accordingly cause the piston 111 to move in the direction of the applied or differential force.

When fluid is flowing freely from the small ports 82 of the stylus, the pressure difference between the rod end and head end of the differential piston and cylinder assembly 110 is of a value such that the force $F_2$ applied at the head end is less than the force $F_1$ applied at the rod end. Thus the piston 111 will be forced to its extreme retracted position (leftmost position as viewed in FIG. 2). In this retracted position the external portion 113 of the piston 111 causes an attached microswitch 124 (or other drill head control apparatus) to be in the first of its two states shown in FIG. 2 as having open contacts 127 and 129. This first state of the microswitch is not effective to cause lowering of the bits of the drill heads 14, 16, 18 and 20 (FIG. 1).

Lowering of the stylus 42, by manual means as described previously, causes the apex of the stylus 42 to be inserted into the template hole 40 and the tapered wall 76 makes sealing contact with the circular edge 78 of the hole 40. This position of the stylus, as shown in FIG. 2, shuts off flow of fluid from the small ports 82 to atmosphere. In this condition the fluid in bore 80, conduits 120, 112 and 116 will cease to flow and the pressure therein will rise to the same pressure as in conduits 98, 100, 102. Thus, the pressure applied to the head end and rod end of the differential piston and cylinder apparatus will be the same. It will be clear to those skilled in the art to which the present disclosure pertains, that when the fluid pressure apparatus are equal, the force $F_2$ acting on the piston at the head end is greater than the force $F_1$ acting on the piston at the rod end. Thus the force $F_2$ will prevail over the force $F_1$, and effect movement of the piston in a direction away from the head end and toward the rod end. This will cause the external portion 113 of the piston 111 to be extended and close the contacts 127 and 129 of the microswitch 124.

The contacts 127 and 129 of the microswitch 124 are operatively connected to an electrical circuit, indicated by leads 131 and 133, which is part of a control means or system 135 for simultaneously lowering the drill bits a predetermined amount into drilling engagement with the articles 30, 32 and 34 of FIG. 1, and for automatically raising the bits after drilling of the articles. Such control systems 135 will be well-known to those skilled in the art to which the present disclosure pertains.

After simultaneous drilling of the articles and raising of the drill bits, the trigger mechanism is again squeezed to raise the stylus out of the selected template hole 40. Such acion will enable flow of fluid through the small ports 82 of the stylus 42 which in turn will cause the piston 111 of the differential piston and cylinder apparatus to retract, as described previously. The contacts 127 and 129 of the microswitch will then be opened. This will effect conditioning of the control means 135 for another cycle of operation upon the next closing of the microswitch's contacts in the same manner as described previously.

It should be noted at this point that often when the stylus 42 is first begun to be lowered into a template hole 40, the stylus is not exactly centered over the hole 40. In such an event, one side of the tapered surface 74 of the stylus contacts one side of the upper edge 78 of the hole, as shown in phantom lines 42' at the left in FIG. 2. Since the template is nonmovable with respect to the base 12 the downward force of spring 62 will react against the edge of the hole 40 and shift the entire translator frame 24 sideways and thus effect exact centering of the stylus with the hole, and of course, exact positioning of the drill heads and bits with respect to the articles to be drilled.

While the preferred embodiment is shown and described as utilizing a differential piston and cylinder apparatus it will be appreciated by those versed in the art to which the present disclosure pertains, that other devices responsive to changes in pressure differential between conduits 102 and 116 may be utilized. For example, it has been suggested that a fluidic amplifier is responsive to changes in fluid pressure differentials and could be used in the present invention instead of the differential piston and cylinder apparatus 110.

There has thus been shown and described a novel and improved control system for initiating the lowering of drill bits of a multihead drilling apparatus in accordance with full seating of a control stylus in predrilled holes of a master template. The present invention has been shown to offer the desirable advantage, over prior art devices, of being highly accurate in spite of wear and warpage to the master template, or the stylus, or both.

What I claim is:

1. In combination with an apparatus having a portion thereof movable between a first state and a second state; control means for selectively placing said portion in either of said states, said control means comprising:

means for conveying fluid under pressure, said means having an upstream end and a downstream end, said downstream end being normally open;

fluid supply means coupled to said upstream end of said conveying means for furnishing pressurized fluid to said conveying means with a substantially constant pressure at said upstream end, said pressurized fluid normally flowing from said upstream end to said downstream end with a differential in fluid pressure as said fluid flows;

an adjustable fluid flow restriction means for selectively establishing said fluid pressure differential at a predetermined value;

stylus means for selectively closing said downstream end of said conveying means wherein fluid will cease to flow in said conveying means, said cease in fluid flow resulting in an equalizing of fluid pressure throughout substantially the entire fluid conveying means;

said stylus means being operatively connected with said fluid conveying means at said downstream end and being formed with a generally tapered surface and a fluid conveying bore opening outwardly at said tapered surface wherein fluid flows from said source of pressurized fluid through said conveying means and thence through said bore to the space externally said bore;

actuator means operatively coupled to said fluid conveying means and to said apparatus portion, said actuator means being responsive to said fluid pressure differential and said pressure equalization, wherein said portion is placed in its first state when said fluid pressure differential is present in said fluid conveying means and wherein said portion is placed in its second state when said fluid pressure equalization is present in said fluid conveying means;

said actuator means being operatively coupled to said fluid conveying means at locations both upstream and downstream of said restriction means.

2. The combination according to claim 1 wherein said actuator means comprises a differential piston and cylinder means having a head end and a rod end, and wherein there is further included first fluid conduit means operatively coupled between said fluid conveying means at a first location and the rod end of said differential piston and cylinder means; second fluid conduit means operatively coupled between said fluid conveying means at a second location downstream from said first location and the head end of said piston and cylinder means.

3. The combination according to claim 1 wherein said actuator means comprises a differential piston and cylinder means having a piston portion extending into operative contact with said apparatus portion.

References Cited

UNITED STATES PATENTS

| | | | |
|---|---|---|---|
| 1,585,529 | 5/1926 | Bouing | 91—416 |
| 2,018,977 | 10/1935 | Spellman et al. | 91—366 |
| 3,087,470 | 4/1963 | Beard et al. | 91—47 |
| 2,625,136 | 1/1953 | Moog | 91—417 |
| 2,780,242 | 2/1957 | Dyson | 91—417 |
| 2,980,069 | 4/1961 | Hilker et al. | 91—417 |
| 3,033,170 | 5/1962 | Norton et al. | 91—417 |
| 3,110,783 | 11/1963 | Strom et al. | 91—417 |

PAUL E. MASLOUSKY, Primary Examiner

U.S. Cl. X.R.

91—417; 77—5

PO-1050
(5/69)

UNITED STATES PATENT OFFICE
CERTIFICATE OF CORRECTION

Patent No. 3,518,918 Dated July 7, 1970

Inventor(s) Lyndon L. Keown

It is certified that error appears in the above-identified patent and that said Letters Patent are hereby corrected as shown below:

Column 2: line 53, change "transistor" to -- translater --.

Column 3: line 46, change "horiontal" to -- horizontal --;
line 55, change "thredaed" to -- threaded --;
line 71, change "horiontal" to -- horizontal --.

Column 4: line 36, change "prevoiusly" to -- previously --;
line 74, after "of" insert -- a --.

Column 5: line 22, change "Fliud" to -- Fluid --;
line 73, after "pressure", last word, insert -- applied to both ends of a differential cylinder and piston --.

Column 6: line 14, change "systems" to -- system --;
line 19, change "acion" to -- action --.

Column 7: line 13, after "externally", last word, insert -- of --.

---

Signed and sealed this 23rd day of March 1971.

(SEAL)
Attest:

EDWARD M. FLETCHER, JR.
Attesting Officer

WILLIAM E. SCHUYLER, JR.
Commissioner of Patents